United States Patent
Otanez et al.

(10) Patent No.: US 8,332,109 B2
(45) Date of Patent: Dec. 11, 2012

(54) CLOSED-LOOP FEEDBACK CONTROL AND REDUCTION OF THE TORQUE CONVERTER CLUTCH SLIP FOR ENHANCED DRIVABILITY FOR HEAVY TIP-IN MANEUVERS

(75) Inventors: Paul G. Otanez, Troy, MI (US); Chunhao J. Lee, Troy, MI (US); Farzad Samie, Franklin, MI (US); Scott A. Hearld, Waterford, MI (US); Xu Chen, Ann Arbor, MI (US); Daniel J. Wickman, Plymouth, MI (US); Xuefeng Tim Tao, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 12/651,525

(22) Filed: Jan. 4, 2010

(65) Prior Publication Data

US 2011/0166757 A1 Jul. 7, 2011

(51) Int. Cl.
*G06F 19/00* (2011.01)
(52) U.S. Cl. .............. 701/60; 701/54; 477/78; 477/115; 477/166
(58) Field of Classification Search .................... 701/60; 477/78, 115, 166
See application file for complete search history.

(56) References Cited

U.S. PATENT DOCUMENTS

| | | | |
|---|---|---|---|
| 6,345,223 B1 * | 2/2002 | Takizawa et al. | 701/53 |
| 7,302,330 B1 * | 11/2007 | Holtz et al. | 701/51 |
| 7,769,518 B2 * | 8/2010 | Segawa et al. | 701/68 |
| 2009/0149298 A1 | 6/2009 | Otanez et al. | |
| 2009/0150032 A1 | 6/2009 | Samie et al. | |
| 2011/0060509 A1 | 3/2011 | Otanez et al. | |

OTHER PUBLICATIONS

U.S. Appl. No. 12/651,529, Otanez et al.
U.S. Appl. No. 13/112,094, Lee et al.

* cited by examiner

*Primary Examiner* — Behrang Badii
*Assistant Examiner* — Shardul Patel (57) ABSTRACT

A method for responding to a rapid change in engine torque includes monitoring a change in engine torque and determining a rapid change in engine torque when the change in engine torque exceeds a threshold change in engine torque. Subsequent to determining a rapid change in engine torque, an increase in the torque converter slip is provided by reducing the torque converter clutch pressure command by a selected value and thereafter the feedback control is deactivated for a predetermined duration. Subsequent to the predetermined duration, the feedback control is reactivated to decrease the torque converter slip toward a desired torque converter slip value.

12 Claims, 7 Drawing Sheets

CLOSED-LOOP FEEDBACK CONTROL AND REDUCTION OF THE TORQUE CONVERTER CLUTCH SLIP FOR ENHANCED DRIVABILITY FOR HEAVY TIP-IN MANEUVERS

TECHNICAL FIELD

This disclosure is related to a system and method for setting the slip in a torque converter of a vehicle.

BACKGROUND

The statements in this section merely provide background information related to the present disclosure and may not constitute prior art.

Internal combustion engine vehicles that employ automatic transmissions typically include a torque converter positioned between the engine and the transmission of the vehicle. A torque converter is a fluid coupling device typically including an impeller at the input coupled to an output shaft of the engine and a turbine at the output coupled to the input shaft of the transmission. The torque converter uses hydraulic fluid to transfer rotational energy from the impeller to the turbine fluidically. The torque converter provides mechanical disengagement of the engine crank shaft from the transmission input shaft, e.g. during vehicle idling conditions to enable the vehicle to stop without stalling the engine.

The rotational speed of the impeller relative to the turbine in the torque converter when fluidically coupled is typically different so that there is a converter slip therebetween. Because large slips between the engine output (torque converter input) and the transmission input (torque converter output) significantly affect the fuel economy of the vehicle, a fluidically controlled torque converter clutch (TCC) may be employed for mechanically transferring torque across the torque converter in fully locked or controlled slip operation. Locking the TCC is generally only used in limited circumstances because of various implications.

A TCC generally has three operating modes—fully released, fully locked, and controlled slip. When the TCC is in the fully released operating mode, all torque transfer across the torque converter is by virtue of fluid coupling with no mechanical torque transfer across the TCC. When the TCC is in the fully locked operating mode, all torque transfer across the torque converter is by virtue of mechanical coupling across the TCC. When the TCC is in the controlled slip operating mode, the slip across the torque converter is controlled by controlling the pressure of hydraulic fluid in the TCC which controls the application force across the TCC.

Rapid changes in throttle request result in rapid changes to engine torque applied to the torque converter. Rapid increases in engine torque can result in torque converter slip changing from a controlled value to an excessive value that must be controlled back to a controlled value.

To increase fuel economy, a desired torque converter slip at the torque converter is minimized However, after a rapid increase in engine torque, for example corresponding to a significant increase in throttle request or heavy tip-in maneuver, the vehicle operator expects an increase in engine speed and torque converter clutch slip. In order to deliver the expected behavior, the TCC pressure must be reduced to a value that allows a timely increase in engine speed yet does not compromise the torque converter clutch hardware by excessively increasing the torque converter clutch slip. Additionally, the increased torque converter slip must subsequently be brought under control after the tip-in maneuver ends in order to reestablish fuel efficient operation.

SUMMARY

A powertrain includes an engine, a transmission, a torque converter located between the engine and the transmission, and a torque converter clutch. The torque converter clutch is responsive to a torque converter clutch pressure command including a slip-based feedback control controlling a torque converter slip. A method for responding to a rapid change in engine torque includes monitoring a change in engine torque and determining a rapid change in engine torque when the change in engine torque exceeds a threshold change in engine torque. Subsequent to determining a rapid change in engine torque, an increase in the torque converter slip is provided by reducing the torque converter clutch pressure command by a selected value and thereafter the feedback control is deactivated for a predetermined duration. Subsequent to the predetermined duration, the feedback control is reactivated to decrease the torque converter slip toward a desired torque converter slip value.

BRIEF DESCRIPTION OF THE DRAWINGS

One or more embodiments will now be described, by way of example, with reference to the accompanying drawings, in which:

FIG. 3A depicts an initial detection of a tip-in event and subsequent actions regarding the TCC pressure commands;

FIGS. 3B and 3C depict alternate processes that can be employed to set the period through which the pressure commands can be frozen;

FIG. 3D depicts a process wherein the engine speed is controlled by an engine control scheme through a period;

FIGS. 3E and 3F depict alternate processes that can be utilized if the temperature of the TCC exceeds a limit temperature;

FIG. 3E depicts a process to completely release the TCC in response to the temperature exceeding the temperature limit;

FIG. 3F depicts a process to lock the TCC in response to the temperature of the TCC exceeding the temperature limit;

FIG. 3G depicts a process to reestablish feedback control of the TCC pressure command for the purpose of restoring control of the torque converter slip to a desired value;

FIGS. 3H and 3I depict alternative processes for recovering the overall process to a steady state condition after the reduction of slip to a desired value;

FIG. 3H depicts a process that can be utilized when an engine speed control is utilized in a ramp down pattern to reduce torque converter slip;

FIG. 3I depicts a process that can be utilized when a time constraint, utilized in combination with a pressure command feedback control, is used to reduce torque converter slip to a desired value.

DETAILED DESCRIPTION

Figure 1:
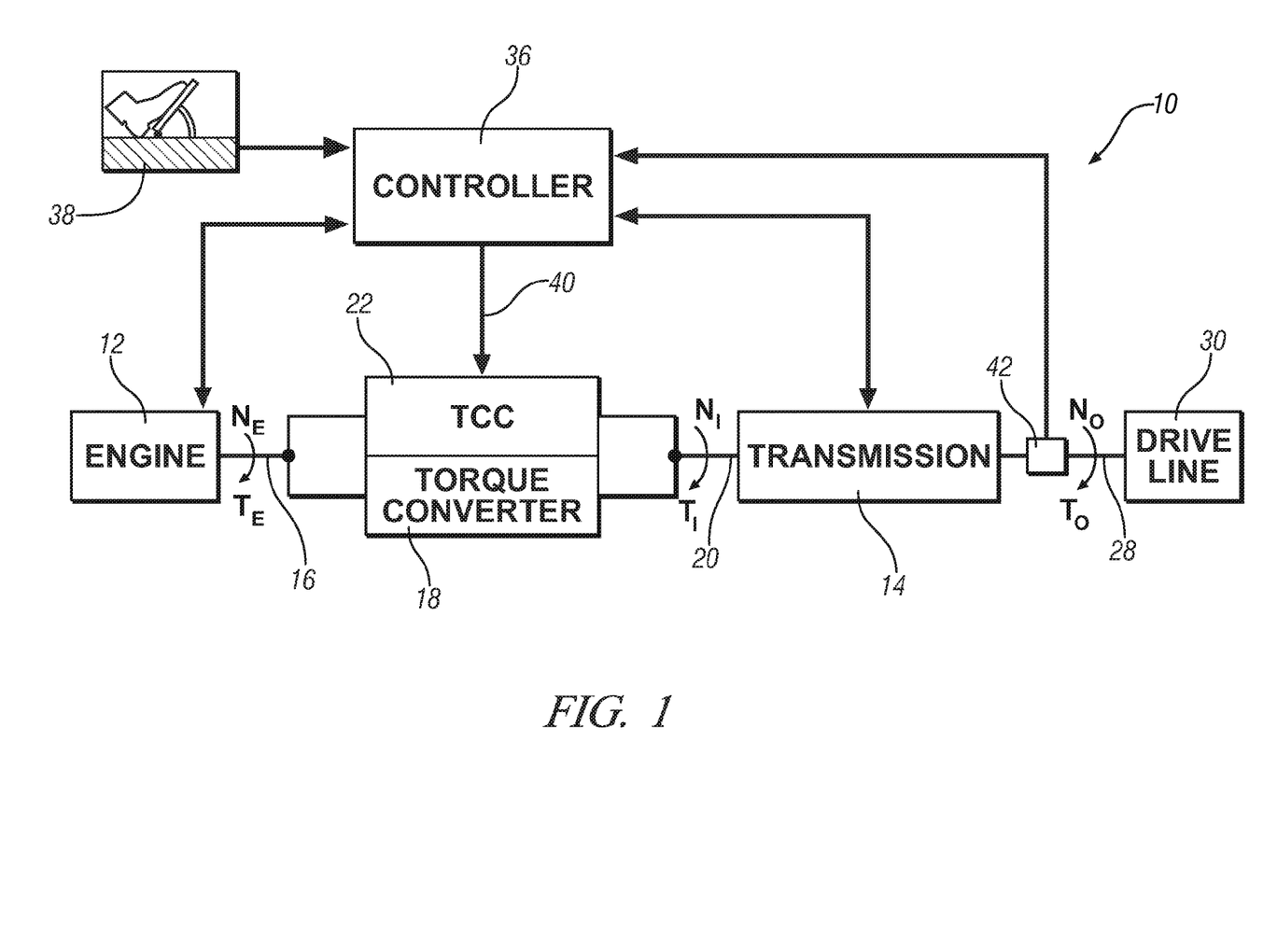
FIG. 1 is a block diagram showing various drive-train components of a vehicle, in accordance with the present disclosure.

Referring now to the drawings, wherein the showings are for the purpose of illustrating certain exemplary embodiments only and not for the purpose of limiting the same, FIG. 1 is a block diagram of various powertrain components of a vehicle 10. The powertrain components include an engine 12 and a transmission 14. An output shaft of the engine 12, represented by line 16, is coupled to one end of a torque converter 18, and an input shaft of the transmission 16, represented by line 20, is coupled to an opposite end of the torque converter 18. As discussed above, the torque converter 18 transfers rotational energy from the engine 12 to the transmission 14 using hydraulic fluid so that the engine 12 can be disengaged from the transmission 14 when necessary. A TCC 22 sets a torque converter slip in the torque converter 18 between the engine 12 and the transmission 14, as discussed above. In this diagram, engine output power is depicted as engine speed ($N_E$) measured in revolutions per minute (RPM) and engine torque ($T_E$) measured in Newton-meters. Likewise, the speed of the transmission 14 at its input is represented by transmission input speed $N_I$ and transmission torque $T_I$. The torque slip in the torque converter 18 is defined as $N_E$ minus $N_I$. An output shaft of the transmission 14, represented as line 28, is coupled to a driveline 30 of the vehicle 10 that distributes the engine power to the vehicle wheels in a manner that is well understood to those skilled in the art. The speed of the output shaft 28 of the transmission 14 is represented as $N_O$ and the torque of the output shaft 28 of the transmission 14 is represented as $T_O$.

The vehicle 10 also includes a controller 36 intended to represent both an engine controller and a transmission controller; however, it will be appreciated that these two controlling functions can be served by a single device or a plurality of communicatively connected devices. The controller 36 receives a throttle position signal from a vehicle throttle 38, and provides control signals to the engine 12 for engine speed and torque related control and signals to the transmission 14 for shift related control. Additionally, depending on the selected engine speed and transmission gear, the controller 36 provides a signal (i.e. a TCC pressure command) on line 40 to the TCC 22 to set the desired torque converter slip. A sensor 42 measures the output behavior of the transmission 14. In one exemplary embodiment, the sensor 42 measures the rotational speed of the output shaft 28 of the transmission 14 and sends a speed signal to the controller 36. Exemplary sensors include an encoder, speed sensor, accelerometer, torque sensor, etc.

The controller 36 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit (s), input/output circuit(s) and devices, appropriate signal conditioning and buffer circuitry, and other suitable components to provide the described functionality. The controller has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked controllers, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The present disclosure includes an exemplary process for adjusting the torque converter slip in response to changes in engine speed and/or transmission gear and/or engine torque. The controller 36 selects the particular slip and transmits a corresponding TCC pressure command to the TCC 22 on line 40 for the current engine speed, transmission gear and engine torque based on a pre-populated table that is stored in the controller 36 as a result of vehicle testing or other operations for a minimum torque converter slip that provides good fuel economy and reduced vibration transfer. One process for populating such a table can be found in U.S. patent application Ser. No. 12/043,499, filed Mar. 6, 2008, commonly assigned to the assignee of the present application, and incorporated herein by reference. If the selected torque converter slip for a particular engine speed, transmission gear and engine torque does not provide the desired slip for preventing vibrations from being transferred to the driveline 30, then the signal from the sensor 42 is used to determine the vibrations in the controller 36, which can then increase the torque converter slip if the vibrations exceed a predetermined threshold.

Torque converter slip can be controlled by application of the TCC. The TCC includes structures mechanically, electronically, or fluidically operated to controllably couple the impeller and turbine of the torque converter, modulating an allowed slip therebetween. When the TCC is fully released, the fluidic coupling of the impeller and the turbine establish slip. When the TCC is fully locked, no slip between the impeller and turbine are possible. In one exemplary control method, the TCC fluid pressure is controlled so that the torque converter slip approaches a desired value. By reducing the pressure of the hydraulic fluid in the TCC, torque converter slip for a given operating condition will increase. Similarly, by increasing the pressure of the hydraulic fluid in the TCC, torque converter slip for a given operating condition will decrease.

Methods of feedback control are known in the art. Such methods monitor a desired value, control an output according to the desired value, and utilize a resulting value of the controlled output to subsequently improve control to the desired value. Feedback control is known to control slip in a torque converter through variable control of TCC pressure. A desired torque converter slip can be monitored, a TCC pressure command can be modulated in order to control resulting torque converter slip, and the resulting torque converter slip can be used in a feedback loop to subsequently modulate the TCC pressure command. In this way, feedback control can be utilized to control torque converter slip to a desired value. The desired value can be a steady state term, substantially unchanging through a time period, or the desired value can be transitory, for example, increasing or decreasing through a period or changing according to a step profile.

Rapid changes in engine torque can result from a change in throttle demand by the operator of the vehicle or by requests resulting from vehicle control methods, for example, including changes required for a transmission gear change or changes commanded by a cruise control system. A tip-in throttle demand or tip-in event describes a rapid increase in throttle demand or output torque request by the operator. One method to indicate a rapid increase in engine torque such as a tip-in throttle demand includes measuring a throttle position sensor (TPS) output and determining whether a rate of change in TPS exceeds a threshold rate of change in TPS. Different degrees of changes to engine torque can be quantified, for example, with a significantly rapid change in engine torque being indicated by comparison to an increased threshold rate of change in TPS. Rate of change in TPS can be calculated in a number of ways, for example, through direct numerical differentiation, operation of Kalman Filter, or other methods known in the art. This threshold rate of change in TPS can be selected by a number of methods to indicate a rapid increase in throttle demand, such as by calibration or modeling sufficient to describe torque converter slip response to a change in TPS. A rapid increase in engine torque may alternatively be determined by monitoring, for example, at least one of engine torque, air mass flow, and fuel flow.

While torque converter slip can be controlled to some small value in steady state operation, rapid changes in engine torque are known to result in rapid increases in torque converter slip resulting from a lag in a reaction time of methods utilized to control slip. Excess slip reduces fuel efficiency of the powertrain and torque output to the output shaft and must in many operating conditions is undesirable and requires adjustment within the torque converter to regain control of the slip. Further, feedback control of torque converter slip, described above, responding to a rapid change in torque converter slip, can result in unpredictable changes to the torque converter slip, for example, feedback induced sharp increases in TCC pressure commands resulting in the slip quickly being reduced to zero. Rapidly changing slip resulting in zero slip can result in perceptible and undesirable effects to drivability.

High slip in a torque converter is avoided under many operating conditions. However, as described above, a rapid change in engine torque, such as indicated by a tip-in event or throttle demand by the operator, includes an expectation by the operator of a certain response in the vehicle. The operator expects to see a rapid increase in $N_E$ following a large increase in accelerator pedal depression. Such a rapid increase in $N_E$ is facilitated by an increase in torque converter slip, with the increased slip allowing the engine to achieve higher engine speeds more quickly than would be possible with a locked torque converter or a torque converter with low slip. In this way, allowing increased torque converter slip for a limited time during a rapid change in engine torque increases the ability of the powertrain to be responsive to the demands of the operator.

By controlling the TCC pressure command, torque converter slip can be allowed to rise in response to a rapid change in engine torque. For example, the TCC pressure command can be reduced by some calibrated or selected amount during a period immediately following a monitored rapid change in engine torque. The drop in pressure command, in order to allow torque converter slip within an acceptable range, can be selected according to calibration test results or results predicted through a model sufficient to predict operation of the torque converter, and a multitude of drop values can be utilized for different conditions or operating ranges. Such drop in pressure command values can be stored in a look-up table or can be derived from a functional relationship. The selection of drop in pressure command values can be made according to factors affecting the torque converter slip resulting from the TCC pressure command and can be selected according to the resulting change in $N_E$. Factors affecting the resulting torque converter slip include but are not limited to the change in TPS, $N_E$, and selected transmission gear.

Once the TCC pressure command has been reduced in response to the rapid change in engine torque, slip will increase. Operation of the feedback control normally under operation to control torque converter slip to a desired value would operate to quickly increase the TCC pressure command in order to bring the slip back under control. In this situation wherein slip is intentionally being increased to facilitate desired operation of the powertrain in response to the rapid change in engine torque, the feedback control can be deactivated in order to avoid the system attempting to immediately reduce the slip. By freezing the TCC pressure command at the value to which the TCC pressure command is reduced, torque converter slip can be controllably increased to provide the increase in $N_E$ described above. This controlled increase in slip can be controlled for a period in order both to allow $N_E$ and $T_E$ to increase and to provide the expected response to the operator. After the period, the slip can be subsequently reduced back to a controlled level of slip in accordance with fuel efficient operation of the vehicle.

The TCC pressure command can be controlled in order to control slip in response to a rapid change in engine torque, such as a tip-in event. As described above, reducing and then freezing the TCC pressure command is one method to allow a controlled increase in slip. In one related embodiment, after reducing the TCC pressure command, only the feedback portion of the TCC pressure command is frozen or deactivated. Such an exemplary system can include a TCC pressure command described by the following relationship.

$$TCC\ pressure\ command = feedback\_term + feed\_forward\_term \quad [1]$$

The feed forward control term (feed_forward_term) can be based upon many different factors affecting torque applied through the torque converter. In one exemplary embodiment, the feed forward control term is based upon engine torque, with the feed forward control term increasing with increasing engine torque. A feed forward control term changing roughly proportionally to engine torque would increase in response to a monitored rapid increase in engine torque, but because the feed forward control term is responsive to engine torque, the increases to each are proportional. As a result, the increase to the feed forward control term would be unlikely to cause unpredictable or jerky motion in the torque converter. It will be appreciated that the feedback control term (feedback_term), based upon a difference between a desired slip (TCC pressure command) and measured slip, in response to a large increase in slip resulting from a transition in engine torque, would drive a sharp increase in the TCC pressure command. This sharp increase in the feedback control term lags the increase in slip. Likewise, if the feedback control term causes the TCC to clamp down strongly to reduce measured slip, the reduction of the feedback control term would also lag a reduction in measured slip. As a result, this feedback control term could cause unpredictable or jerky control of the torque converter, for example, resulting in a "crash" to zero slip in the torque converter. As a result, a method is disclosed to freeze or deactivate the slip-based feedback control term for a predetermined duration, while maintaining the feed forward control term through a rapid change in engine torque. Both manners of deactivating the feedback control, whether freezing or deactivating the entire TCC pressure command or only the feedback control term, are referred to as freezing or deactivating feedback control.

A period of increased slip following initiation of a rapid change in engine torque can be used to facilitate an increase in $N_E$ and $T_E$, as described above. The period of controlled increased slip must be long enough to allow the engine to undergo the desired transition. However, it will be appreciated that during the period of increased slip, the powertrain is operating with reduced efficiency, with a decreased percentage of produced $T_E$ being transferred to the driveline of the vehicle. In order for a timely increase in $T_O$ to occur, the increased slip must eventually be reduced back to a controlled or desired value. A number of methods are envisioned to set the duration for freezing or deactivating the feedback control. In one exemplary method, the duration is set to a specific time. The time can be a fixed interval or the time can be developed as a calibration or function of factors affecting the transition. Factors affecting the transition related to the tip-in event include but are not limited to the magnitude of the change in TPS, magnitude in change of engine torque, $N_E$, temperature, type of application (non sporty/sporty model) and transmission gear selection. Such a calibration number can be stored in a memory device within an exemplary look-up table. In an alternative embodiment, the duration can begin at the initiation of a monitored rapid increase in engine torque and terminate based upon engine behavior. For example, the increase in $N_E$ can be monitored, and, upon $N_E$ reaching a peak or otherwise stabilizing, the duration can be terminated. A number of similar methods are envisioned to set the period for increased slip, and the disclosure is not intended to be limited to the particular exemplary embodiments described herein.

During the period of increased slip, $N_E$ is exposed to varying feedback torque or resistance from the torque converter due to the changes in slip and other transitions occurring within the powertrain. As a result, $N_E$ can change, leading to unpredictable results in the transition. A method is disclosed to counter this changing operation of the engine wherein, after $N_E$ has initially increased in response to the tip-in event, $N_E$ is controlled to a desired engine speed through closed-loop feedback control through the remainder or some part of the period of increased slip. In this way, $N_E$ can be controlled during a period of rapid changes to engine torque and resulting changes to torque converter slip.

One exemplary method to control $N_E$ is to set the desired engine speed to the maximum engine speed, for example, determined by the first instance wherein the $N_E$ decreases, reached as a result of the tip-in event. According to one embodiment described above, this peak in $N_E$ substantially corresponds to a point where slip reaches a maximum value and feedback control to the TCC pressure commands is restored. Another exemplary method to select the desired engine speed is to determine a rate of change of the engine speed or a slope of a plot of the engine speed over time and set the engine speed to a value when the slope reduces below a threshold value indicating that the engine speed is reaching a steady value. Another exemplary method to select the desired engine speed is to adjust engine speed or TCC slip based upon a desired engine torque value or a desired engine torque profile or curve. By monitoring slip or a change in engine speed, one can calculate or estimate the resulting engine torque according to methods known in the art utilizing an engine torque-speed curve and compare the torque to the desired engine torque value. For a given $N_O$ and resulting $N_I$, a desired TCC slip value, achieved by selecting or modifying the selected or calibrated drop in pressure command, can be selected in order to achieve a desired engine speed resulting in the desired engine torque, as estimated by the engine torque-speed curve. It will be appreciated that engine speed in the transition can be set according to a number of methods, and the disclosure is not intended to be limited to the particular exemplary embodiment disclosed herein. After a period of increased slip corresponding to a rapid change in engine torque, $N_E$ can be controlled to avoid variability during a period wherein feedback control to the TCC pressure commands is reactivated to restore control of the increased slip to desired slip levels.

As described above, an occurrence of increased or excessive slip can be controlled by modulating the TCC pressure command. Feedback and feed forward control schemes can be utilized, once activated, to reduce slip in the torque converter. Activation of the schemes to control torque can be initiated at different times relative to the event creating increased slip. For example, as described above, feedback control can be frozen or deactivated for some time to allow increased slip in order to achieve a desired increase in $N_E$. Control schemes embodied as slip profiles can be defined in a number of ways to controllably reduce slip subsequent to such feedback control deactivation. For example, a slope of the TCC pressure commands or a rate of change of the TCC pressure commands can be controlled to a desired level. In another embodiment, a set time constraint can be utilized, with pressure commands being set to transition from an initial value to a desired value by the expiration of the time constraint. The profile utilized, either within a transition controlled by slope or a time constraint, can follow a number of profile shapes based upon mathematical expressions, including but not limited to a linear reduction, an exponential decay reduction, a quadratic reduction or a reduction based upon a quadratic formula, a spline-defined reduction, a filter-based reduction, or other similar profile shapes known in the art.

As described above, $N_E$ can be controlled through a transition to avoid variability in $N_E$ while the TCC is utilized to reduce torque converter slip. In another exemplary embodiment, engine speed can be controlled to cooperatively reduce torque converter slip with the TCC. For example, instead of engine speed commands freezing at the peak of $N_E$, $N_E$ can instead be reduced in order to aid in reducing slip. Such a reduction in $N_E$, accomplished by a reduction in engine speed commands, can take many forms. In one exemplary embodiment, $N_E$ can be controlled similarly to the profile utilized to control the TCC pressure commands, simultaneously reducing $N_E$ in order to reduce slip. The profile utilized to control $N_E$, either within a transition controlled by slope or a time constraint, can follow a number of profile shapes based upon mathematical expressions, including but not limited to a linear reduction, an exponential decay reduction, a quadratic reduction or a reduction based upon a quadratic formula, a spline-defined reduction, a filter-based reduction, or other similar profile shapes known in the art. In another embodiment, $N_E$ can be controlled independently of the TCC pressure commands, with engine speed commands based upon desired engine performance and drivability through the transition. Engine speed commands can be controlled according to a desired slope or rate of change in the engine speed commands or according to a time constraint. Profiles to control engine speed commands or an engine speed command profile can take many forms including profile shapes defined for controlling the TCC pressure commands, described above. Additionally, it will be appreciated that, because reductions in engine speed are cooperating with the TCC pressure commands to reduce slip, engine speed need not continue to reduce through the engine speed command profile but can, for example, temporarily reduce to some intermediate value and recover to a desired higher value as the TCC pressure commands continue to reduce the slip to the desired value. Profiles to control engine speed commands to reduce slip in a torque converter can take many forms, and the disclosure is not intended to be limited to the particular exemplary embodiments described herein.

The above methods describe selecting changes to the TCC pressure commands and changes to engine speed. These methods are described to utilize different mathematical expressions to achieve the desired changes to TCC slip. These mathematical expressions result in a profile that can be controlled, for example, according to a desired time period for the change or based upon a desired slope of the resulting commands (change in command per unit time). It will be appreciated that the profile can be selected or modified as a function of one or more factors affecting the resulting operation or drivability of the vehicle. For example, the change in engine torque associated with the transition can be a factor. Additionally, the current transmission gear can be a factor. Additionally, the temperature of the TCC can be a factor. Additionally, other factors can be including in selecting or modifying the profile, for example, including engine torque versus engine speed characteristics, characteristics of the vehicle, speed of the vehicle, and a monitored road grade in front of the vehicle. Road grade in front of the vehicle can be monitored according to a number of known methods, including use of LIDAR, radar, camera, GPS position and a digital map, camera analysis, vehicle to vehicle communications, and other methods known in the art.

It will be appreciated that slip within the torque converter is a complex term affected by many factors. Monitoring slip during the operation of the methods herein can be useful to accurately reduce the slip according to the desired methods. One exemplary method to determine the slip during the operation of the methods is to calculate the slip based on a desired engine torque curve.

Figure 2:
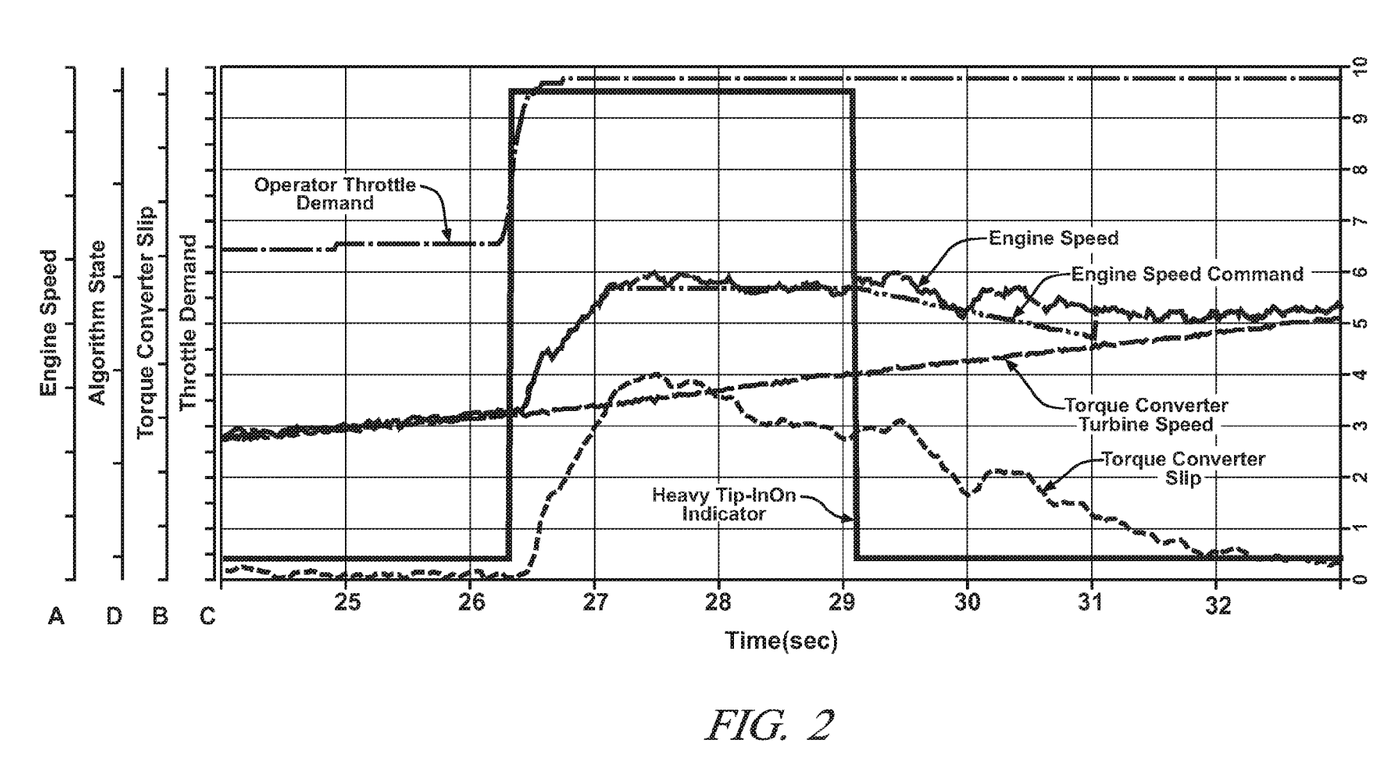
FIG. 2 depicts graphically exemplary operation of a powertrain through a tip-in transition, in accordance with the present disclosure.

FIG. 2 depicts graphically exemplary operation of a powertrain through rapid change in engine torque exemplified by a tip-in transition, in accordance with the present disclosure. Operator throttle demand reflecting input from a TPS is depicted and demonstrates a sudden increase in TPS. Through methods described above, for example, utilizing a Kalman filter, the operator throttle demand is diagnosed to indicate a tip-in event. A tip-in indicator is additionally depicted and demonstrates an activation of the indicator based upon the operator throttle demand. The tip-in indicator is sustained through a transition period. An engine speed command and a resulting engine speed are depicted. The engine speed command is normally a complex signal derived through an engine controller based upon a number of inputs. As the tip-in event is initiated based upon TPS, the engine speed command correspondingly increases. Engine speed closely tracks the engine speed command. Upon the engine speed reaching a local maximum value, defined for example by the first time that an engine speed measurement is less than a previous engine speed measurement, the engine speed command is fixed for a transitional period at the defined maximum value. In the present example, the tip-in indicator is defined to terminate at the end of the period that the engine speed command is fixed at the defined maximum value. The period that the engine speed command is fixed, as described above, is set by one of many methods in order to effect the desired transition in engine speed and engine torque without allowing the transition to take too long. After the transitional period that the engine speed command is fixed, the engine speed in the present embodiment is further controlled to ramp down by some value. Such a ramp down in engine speed command reduces the engine speed, which, as described above, aids in reducing torque converter slip after the transition. After a period, the engine speed command fixed in the ramp down terminates, and engine control is returned to normal methods.

FIG. 2 further depicts torque converter slip. As described above, the methods disclosed herein allow slip to increase following a tip-in event. The depicted data results from utilization of the TCC pressure command described above, wherein, upon recognition of the tip-in event, the TCC pressure command is initially reduced to a selected value and then frozen for a period. As expected from the increase in engine speed and the described TCC pressure commands, slip quickly increases. As the engine speed begins to level off and as a result of forces internal to the torque converter, the slip reaches a maximum value. The torque converter turbine speed is also depicted. As engine speed is maintained at the fixed value and as the TCC pressure command (or a feedback portion of the TCC pressure command) is unfrozen, slip begins to reduce back to a desired low value corresponding to efficient, normal operation. Subsequent to the end of the tip-in indicator, engine speed is unfrozen and reduced to further control slip. In the exemplary embodiment of FIG. 2, a controlled reduction in engine speed is defined by a constant slope reduction in the engine speed command. Such a controlled reduction in engine speed command can be defined, for example, with the reduction ending as the engine speed command reaches a threshold value. The TCC pressure command operating as a closed loop control and operating in combination with controlled engine speed commands cooperatively reduce slip in the TCC. In this way, transition through a tip-in event can be managed to allow a rapid increase in engine speed, aided by a controlled increase in torque converter slip, and subsequently regaining control over the torque converter slip through control of the TCC pressure commands and control of engine speed commands.

Figure 3A:
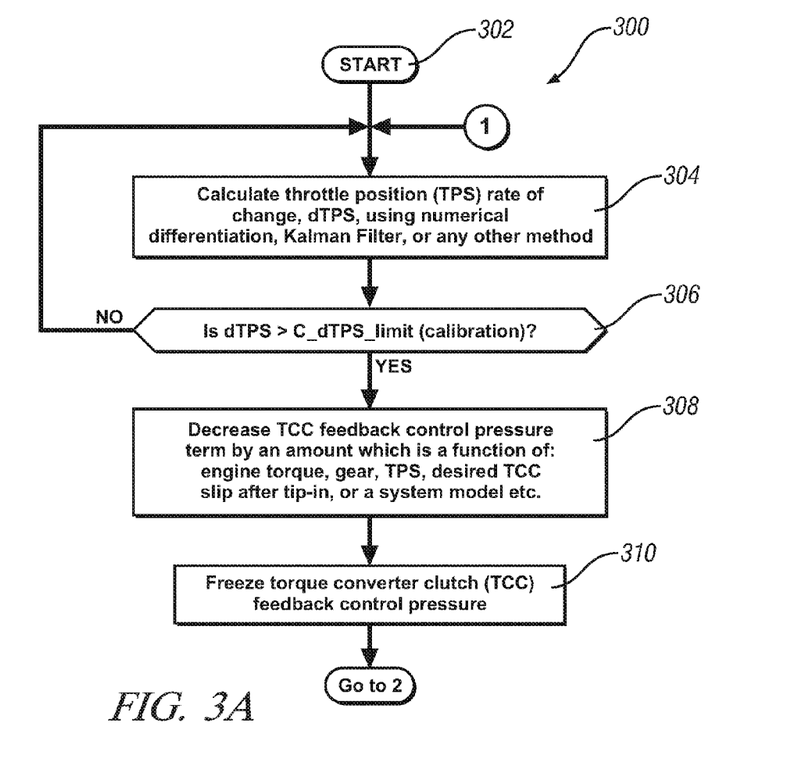
FIGS. 3A-3I depict an exemplary process whereby a tip-in event can be managed, in accordance with the present disclosure.

FIGS. 3A-3I depict an exemplary process whereby a tip-in event can be managed, in accordance with the present disclosure. The exemplary process is depicted in component, smaller processes through each of the FIGS. 3A-3I, and these figures include some alternate paths of the process that might be employed. FIG. 3A depicts an initial detection of a tip-in event and subsequent actions regarding the TCC pressure commands. Process 300 initiates at block 302. At block 304, TPS rate of change is determined At block 306, the TPS rate of change is compared to a threshold TPS rate of change. If the TPS rate of change is less than or equal to the threshold TPS rate of change, the process returns to block 304. If the TPS rate of change is greater than the threshold TPS rate of change, then the process proceeds to block 308. In block 308, a TCC pressure command is decreased by a selected amount. In block 310, the feedback control portion of the TCC pressure command is frozen. The overall process then proceeds to a next portion of the overall process, depicted in either FIG. 3B or FIG. 3C.

Figure 3B:
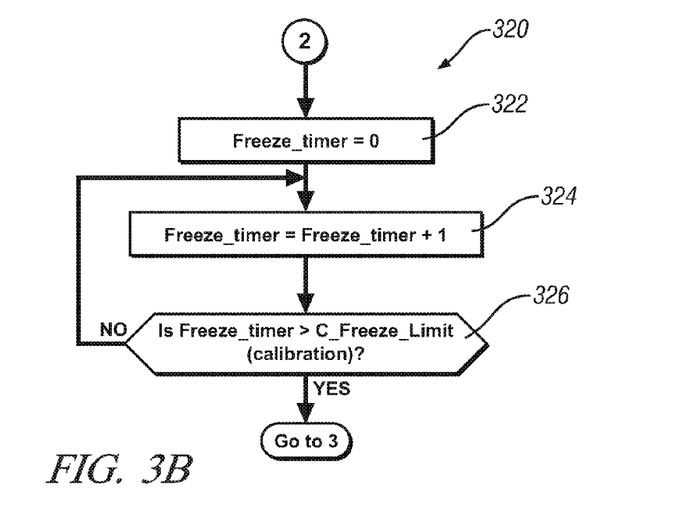
Figure 3C:
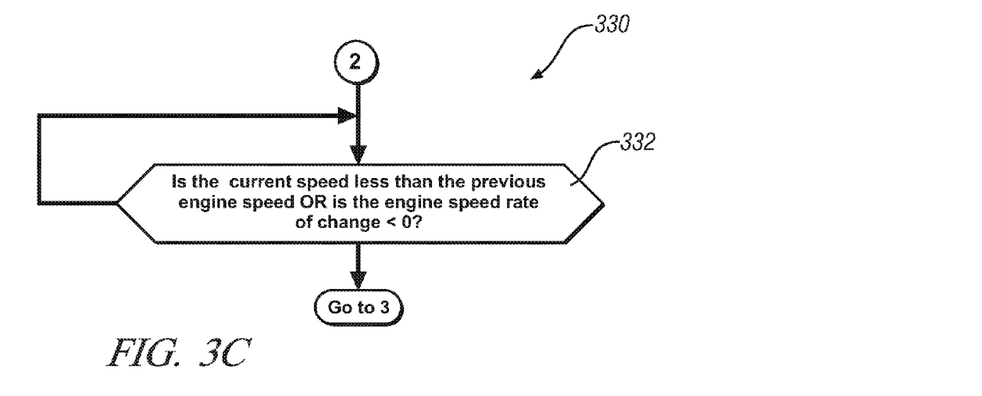
Figure 3D:
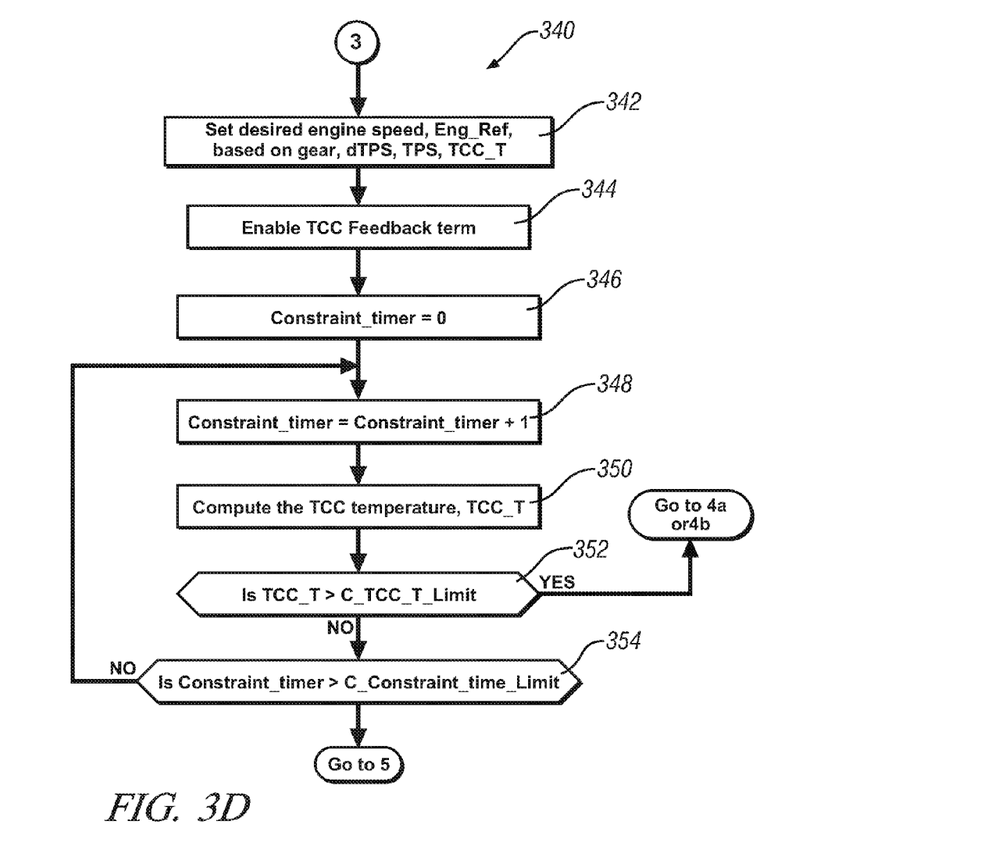

As described above, the TCC pressure commands can be frozen for a predetermined duration to allow the torque converter slip to increase in accordance with the present disclosure. FIGS. 3B and 3C depict alternate processes that can be employed to set the duration through which the TCC pressure commands can be frozen. FIG. 3B, depicts process 320, and at block 322 a freeze timer is set to zero. At block 324, the freeze timer is advanced by one. At block 326, the freeze timer is compared to a threshold value. If the freeze timer is less than or equal to the threshold value, then the process returns to block 324. If the freeze timer exceeds the threshold value, then the process proceeds to a next block (FIG. 3D). The threshold value determines the length of the duration. The threshold value can be a set number to create a period calibrated to a fixed time, can be a value calibrated to factors that affect the transition and the time required for an adequate change in the powertrain, available for example through a look-up table, or can be a value determined according to modeled or functional relationships affecting the transition.

FIG. 3C, in the alternative, depicts process 330, where in block 332 the current engine speed is compared to a previous engine speed or the rate of change of the engine speed is analyzed, and the process proceeds to a next block when a local maximum engine speed is reached (FIG. 3D).

Figure 3E:
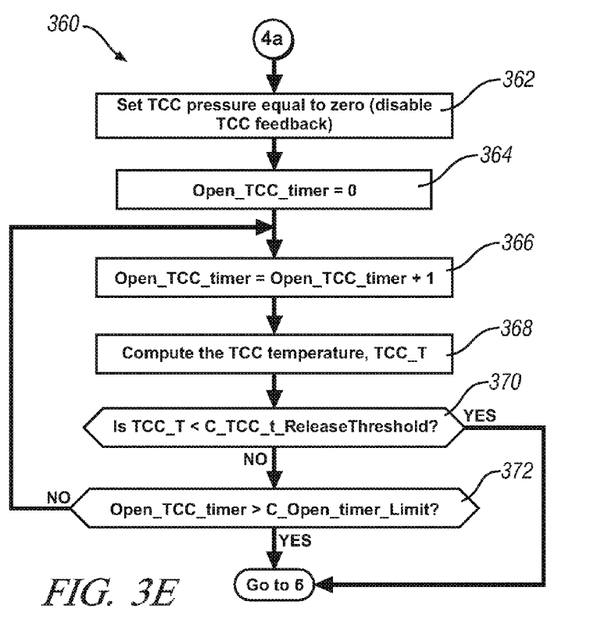
Figure 3F:
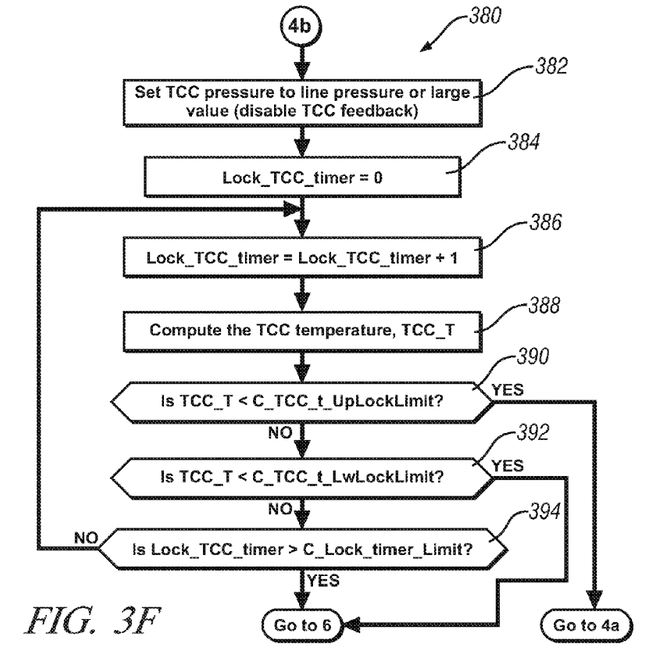
Figures 3G, 3H:
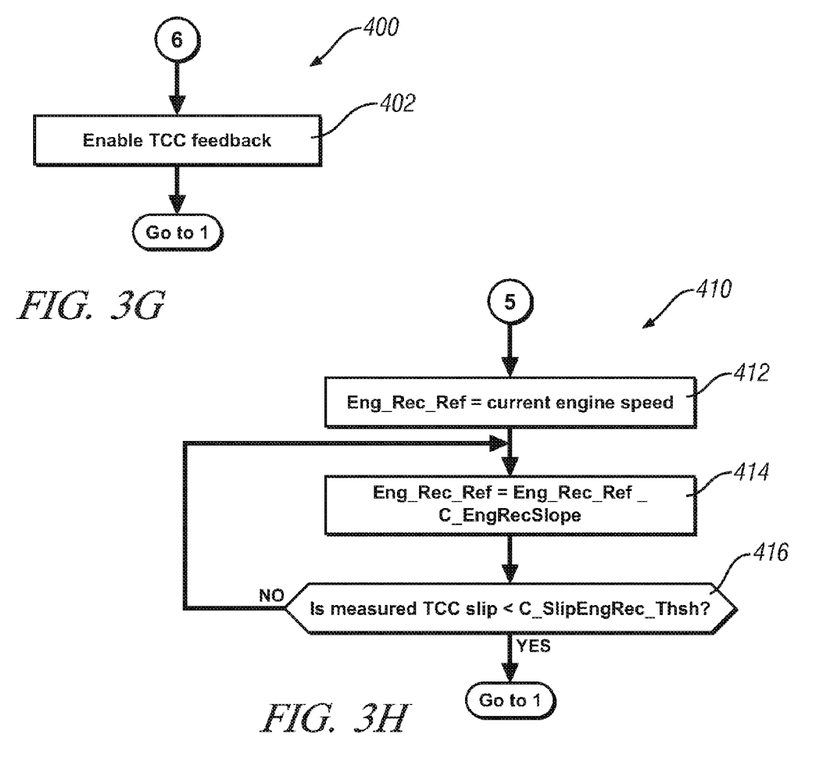
Figure 3I:
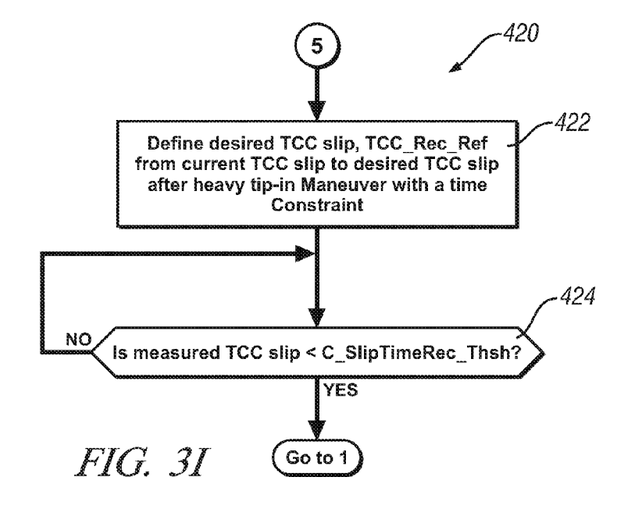

FIG. 3D depicts a process wherein the engine speed is controlled by an engine control scheme through a period. As described above, it can be advantageous to control engine speed through a transition, in order to avoid undesirable engine speed changes caused by changes within the powertrain. Process 340 begins with block 342 by setting the engine speed to a value based upon factors affecting powertrain operation through the transition, in this exemplary embodiment including transmission gear, a rate of change in TPS, TPS, and temperature of the TCC. As will be appreciated by one having ordinary skill in the art, excessive slip in the torque converter with the TCC partially engaged creates frictional forces within the TCC. These frictional forces change based upon the relative speed between the parts in the torque converter and the TCC. As a result, setting the desired engine speed based upon a monitored or estimated temperature of the TCC can be utilized to limit the resulting temperatures and wear within the TCC. At block 344, the TCC feedback control term, frozen in process 300, can be unfrozen to allow the torque converter slip to be controlled from the currently high slip value. At block 346, a constant speed timer is set to zero. At block 348, the constant speed timer is advanced. In the depicted exemplary embodiment, temperature of the TCC can additionally be monitored or determined through the transition and utilized to abort the period of constant engine speed if the temperature of the TCC gets too high. At block 350, the temperature of the TCC is determined It will be appreciated that the temperature of the TCC can be determined directly with a thermal sensor at the TCC or can be determined according to a thermal model evaluating performance of the clutch. At block 352, the temperature of the TCC is compared to a limit temperature. If the temperature is greater than the limit temperature, then the process advances to a block to begin limiting the temperature within the TCC (FIG. 3E, or in the alternative FIG. 3F). If the temperature is less than or equal to the limit temperature than the process advances to block 354. At block 354, the constant speed timer is compared to a timer limit. If the constant speed timer is less than or equal to the timer limit, then the process returns to block 348. If the constant speed timer is greater than the timer limit, then the system proceeds to a next block (FIG. 3H, or in the alternative, FIG. 3I).

FIG. 3D depicts a process wherein a constant engine speed is controlled through a period. However, one having ordinary skill in the art will appreciate that a plurality of speed profiles can be utilized through the transition, affecting different changes to drivability, output torque, engine operation perceptible to the operation, torque converter slip, temperature of the TCC, and numerous other factors affected by engine speed in the transition. These factors can be balanced or optimized depending upon a number of different criteria, and a scheme to command the engine speed through the transition can change (ramp up, ramp down, second order transitions, arcing transitions, etc.) according the balancing of these factors.

FIGS. 3E and 3F depict alternate processes that can be utilized if the temperature of the TCC exceeds a limit temperature. FIG. 3E depicts a process to completely release the TCC in response to the temperature exceeding the temperature limit. Friction, as described above, is caused within a TCC by relative motion of connected parts of the TCC. By entirely releasing the TCC, heat from friction ceases to be generated in the TCC. Process 360 starts at block 362, wherein the TCC pressure command is set zero and commands to change the TCC pressure command, including the feedback commands, are disabled. At block 364, an open TCC timer is set to zero. At block 366, the open TCC timer is advanced. At block 368, the temperature of the TCC is determined At block 370, the temperature of the TCC is compared to a release temperature threshold. The release temperature threshold is selected as a temperature low enough that feedback control of the TCC can be used to reduce torque converter slip without the temperature going too high. If the temperature of the TCC is less than the threshold, then the process advances to the next block (FIG. 3G). If the temperature of the TCC is greater than or equal to the threshold, then the process advances to block 372, wherein the open TCC timer is compared to an open TCC timer limit. If the open TCC timer is less than or equal to the open TCC timer limit, then the process returns to block 366. If the open TCC timer is greater than the open TCC timer limit, then the process advances to the next block (FIG. 3G).

In the alternative to the process depicted in FIG. 3E, FIG. 3F depicts a process to lock the TCC in response to the temperature of the TCC exceeding the temperature limit. As described above, friction is caused within a TCC by relative motion of connected parts of the TCC. In particular, one having ordinary skill in the art will appreciate that heat resulting from friction is proportional to both the normal force between the members and the motion between the members. While locking the TCC, accomplished by increasing the TCC pressure command to a high or maximum available value, will increase the normal force between the members of the TCC, this increased normal force will greatly reduce or cease the relative motion of the members. As a result, a locked or substantially locked TCC should act to decrease the temperature of the TCC. However, it will be appreciated that locking the TCC is a significantly more aggressive method to reduce torque converter slip than the method described in association with FIG. 3E, completely releasing the TCC. Process 380 starts with block 382, wherein the TCC pressure command is set to a large or maximum value and feedback control of the TCC is disabled. At block 384, a TCC lock timer is set to zero. At block 386, the TCC lock timer is incrementally advanced. At block 388, the temperature of the TCC is determined An upper temperature threshold or limit can be defined describing a limit past which thermal damage to the TCC or another component is likely. At block 390, the temperature of the TCC is compared to the upper temperature threshold. If the temperature is greater than the upper temperature threshold, then the process advances to the process of FIG. 3E, wherein the TCC is completely released to allow maximum temperature reduction of the TCC. If the temperature is less than or equal to the upper temperature threshold, then the process advances to block 392, wherein the temperature of the TCC is compared to a lower temperature threshold or limit. The lower temperature threshold is selected to describe a temperature whereat the feedback control of the TCC can be utilized without the temperature of the TCC getting too high. If the temperature of the TCC is less than the threshold, then the process advances to the next block (FIG. 3G). If the temperature of the TCC is greater than or equal to the threshold, then the process advances to block 394, wherein the TCC lock timer is compared to a TCC lock timer limit. If the TCC lock timer is less than or equal to the TCC lock timer limit, then the process returns to block 386. If the TCC lock timer is greater than the TCC lock timer limit, then the process advances to the next block (FIG. 3G).

FIG. 3G depicts a process to reestablish feedback control of the TCC pressure command for the purpose of restoring control of the torque converter slip to a desired value. Process 400 includes block 402 wherein TCC feedback is enabled after one of the processes remedying the temperature of the TCC being over a limit are employed. Process 400 contemplates restoring controlled torque converter slip to a desired value, returning the torque converter to a steady state condition. Process 400, upon completion of block 402, returns the overall process to FIG. 3A, wherein the TPS is monitored to determine a new tip-in event.

FIGS. 3H and 3I depict alternative processes for recovering the overall process to a steady state condition after the reduction of slip to a desired value. FIG. 3H depicts a process that can be utilized when, as depicted in FIG. 2, an engine speed control is utilized, for example, in a ramp down pattern, to reduce torque converter slip. Process 410 starts at block 412, wherein a current engine speed is defined as the reference engine speed control. At block 414, the reference engine speed control is incrementally reduced according to a selected value. In this exemplary case, the selected value is a fixed value related to a selected ramp down slope; however, it will be appreciated that this selected value can be a changing value based upon a desired drawing down of the engine speed through the transition. At block 416, a measured slip value is compared to a threshold slip value, for example, a desired slip value based upon a desired slip value present just before the initiation of the tip-in throttle demand. If the measured slip value is greater than or equal to the threshold slip value, then the process returns to block 414. If the measured slip value is less than the threshold slip value, then the process has achieved steady state, and the process returns to FIG. 3A, wherein TPS is monitored to determine a new tip-in event.

Figure 4:
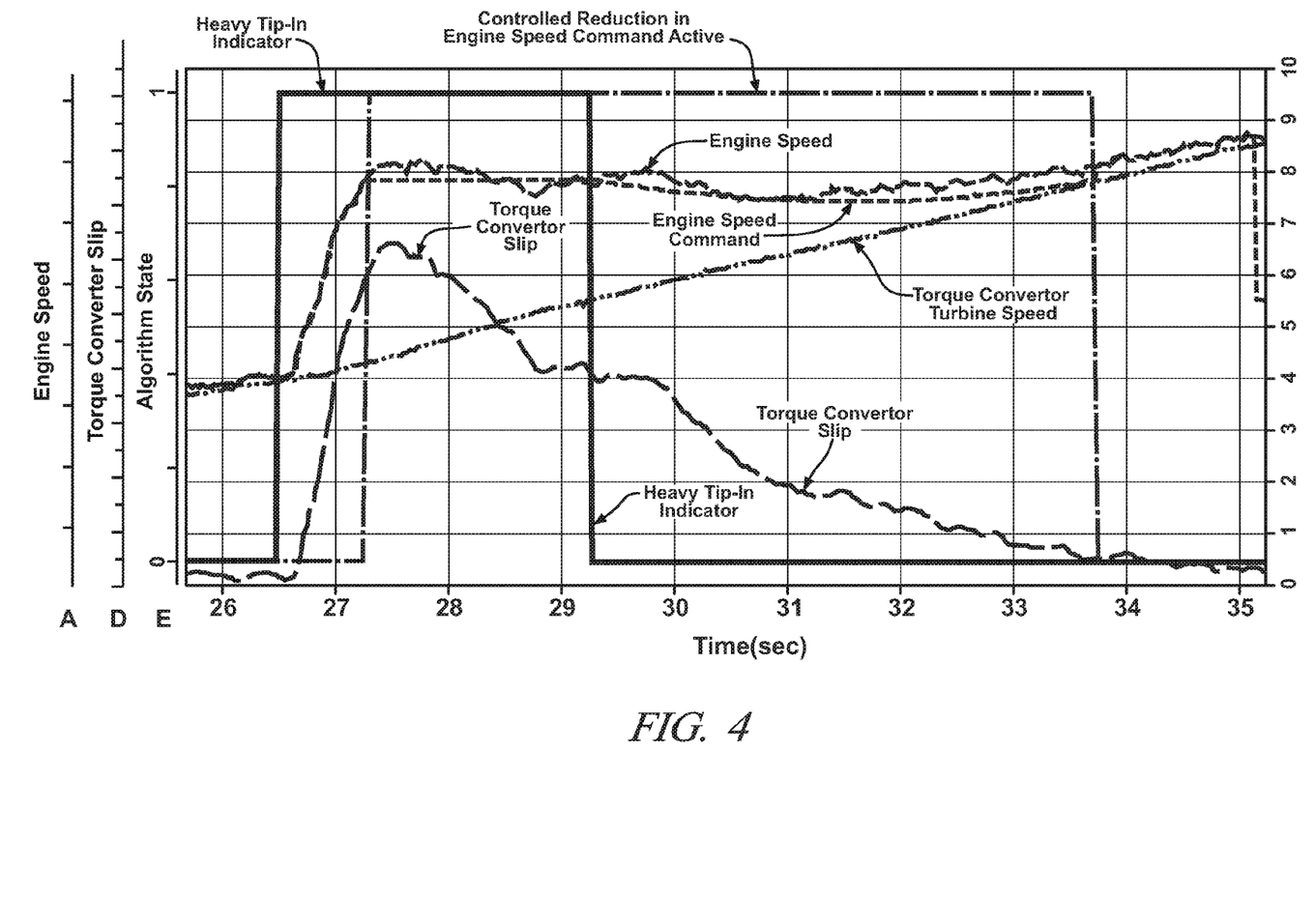
FIG. 4 depicts graphically exemplary operation of a powertrain through a tip-in transition utilizing a time constraint to reduce slip through the transition, in accordance with the present disclosure.

In the alternative to the process illustrated in FIG. 3H, FIG. 3I depicts a process that can be utilized when a time constraint, utilized in combination with a pressure command feedback control, is used to reduce torque converter slip to a desired value. FIG. 4 depicts operation of an exemplary system wherein a time constraint is utilized to reduce slip to a desired slip value, described below. In FIG. 3I, process 420 starts with block 422, wherein a current slip value, a desired slip value, and a time constraint are utilized to define a slip profile from the current value to the desired slip value. The profile between these end points, running through the period defined by the time constraint, can take many forms, including a straight ramp down, an exponential reduction, or a second order or third order curve downwards to the desired slip value. In block 424, a measured slip value is compared to a threshold slip value, for example, a desired slip value based upon a desired slip value present just before the initiation of the tip-in throttle demand. If the measured slip value is greater than or equal to the threshold slip value, then the process returns to block 424 to monitor continued reduction in the torque converter slip. If the measured slip value is less than the threshold slip value, then the process has achieved steady state, and the process returns to FIG. 3A, wherein TPS is monitored to determine a new tip-in event.

FIG. 4 depicts graphically exemplary operation of a powertrain through a tip-in transition utilizing a time constraint to reduce slip through the transition, in accordance with the present disclosure. As in the method described in FIG. 2, FIG. 4 depicts a system that is operating initially at a substantially steady state condition until a tip-in event is initiated, as is evident by the tip-in indicator signal. In response to the corresponding increase in TPS, both the engine speed command and the engine speed dramatically increase. According to methods described herein, the TCC is controlled to allow a sharp increase in torque converter slip, engine speed is controlled or frozen to a value defined by a local maximum value for a transitional period, and TCC commands are unfrozen to allow an initial reduction in TCC slip. As in the exemplary embodiment depicted in FIG. 2, the exemplary embodiment of FIG. 4 after the tip-in indicator ends implements a controlled reduction in engine speed command to cooperatively reduce TCC slip. However, in this exemplary embodiment, the controlled reduction in engine speed command is set by a time constraint. For a fixed time period defining the time constraint, a reduction in engine speed command is plotted. Such a reduction in engine speed can include a variety of profiles and can be selected based upon the resulting performance of the powertrain through the transition and the resulting effects to drivability. In this particular embodiment, the reduction in engine speed command includes a parabolic reduction timed to include substantially equal commands at the disparate ends of the reduction. The TCC pressure command operating as a closed loop control and operating in combination with controlled engine speed commands cooperatively reduce slip in the TCC. In this way, transition through a tip-in event can be managed to allow a rapid increase in engine speed, aided by a controlled increase in torque converter slip, and subsequently regaining control over the torque converter slip.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for responding to a rapid change in engine torque in a powertrain comprising an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; monitoring engine speed; determining a rapid change in engine torque when the change in engine torque exceeds a threshold change in engine torque; subsequent to determining the rapid change in engine torque: providing an increase in the torque converter slip by reducing the torque converter clutch pressure command by a selected value and thereafter deactivating the feedback control for a predetermined duration; determining a local maximum engine speed based upon the monitoring the engine speed; and controlling the engine speed to the local maximum engine speed until the feedback control is reactivated; subsequent to the predetermined duration, reactivating the feedback control to decrease the torque converter slip toward a desired torque converter slip value; and reducing the engine speed to decrease the torque converter slip toward the desired torque converter slip value subsequent to feedback control being reactivated; wherein engine speed is reduced according to a desired slope.

2. The method of claim 1, wherein monitoring the change in engine torque comprises monitoring at least one of throttle position, engine torque, air mass flow, and fuel flow.

3. The method of claim 1, wherein the selected value is set based upon a desired increase in engine speed.

4. Method for responding to a rapid change in engine torque in a powertrain comprising an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; monitoring engine speed; determining a rapid change in engine torque when the change in engine torque exceeds a threshold change in engine torque; subsequent to determining the rapid change in engine torque: providing an increase in the torque converter slip by reducing the torque converter clutch pressure command by a selected value and thereafter deactivating the feedback control for a predetermined duration; determining a local maximum engine speed based upon the monitoring the engine speed; and controlling the engine speed to the local maximum engine speed until the feedback control is reactivated; subsequent to the predetermined duration, reactivating the feedback control to decrease the torque converter slip toward a desired torque converter slip value; and reducing the engine speed to decrease the torque converter slip toward the desired torque converter slip value subsequent to feedback control being reactivated; wherein engine speed is reduced according to a time constraint.

5. Method for responding to a rapid change in engine torque in a powertrain comprising an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; monitoring engine speed; determining a rapid change in engine torque when the change in engine torque exceeds a threshold change in engine torque; subsequent to determining the rapid change in engine torque: providing an increase in the torque converter slip by reducing the torque converter clutch pressure command by a selected value and thereafter deactivating the feedback control for a predetermined duration; determining a local maximum engine speed based upon the monitoring the engine speed; and controlling the engine speed to the local maximum engine speed until the feedback control is reactivated; subsequent to the predetermined duration, reactivating the feedback control to decrease the torque converter slip toward a desired torque converter slip value; and reducing the engine speed to decrease the torque converter slip toward the desired torque converter slip value subsequent to feedback control being reactivated; wherein engine speed is reduced according to a profile comprising one of a linear reduction, an exponential decay reduction, a quadratic reduction, a spline-defined reduction, and a filter-based reduction.

6. The method of claim 5, wherein the profile is based upon at least one of the rapid change in engine torque, a current transmission gear, and a monitored temperature of the torque converter clutch.

7. Method for responding to a rapid change in engine torque in a powertrain comprising an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; monitoring engine speed; determining a rapid change in engine torque when the change in engine torque exceeds a threshold change in engine torque; subsequent to determining the rapid change in engine torque: providing an increase in the torque converter slip by reducing the torque converter clutch pressure command by a selected value and thereafter deactivating the feedback control for a predetermined duration; determining a local maximum engine speed based upon the monitoring the engine speed; and controlling the engine speed to the local maximum engine speed until the feedback control is reactivated; subsequent to the predetermined duration, reactivating the feedback control to decrease the torque converter slip toward a desired torque converter slip value; and reducing the engine speed to decrease the torque converter slip toward the desired torque converter slip value subsequent to feedback control being reactivated; wherein reducing the engine speed to decrease the torque converter slip toward the desired torque converter slip value comprises a temporary reduction in engine speed.

8. Method for responding to a rapid change in engine torque in a powertrain comprising an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; determining a rapid change in engine torque when the change in engine torque exceeds a threshold change in engine torque; subsequent to determining a rapid change in engine torque, providing an increase in the torque converter slip by reducing the torque converter clutch pressure command by a selected value and thereafter deactivating the feedback control for a predetermined duration; and subsequent to the predetermined duration, reactivating the feedback control to decrease the torque converter slip toward a desired torque converter slip value, wherein reactivating the feedback control to decrease the torque converter slip toward the desired torque converter slip value comprises: determining a torque converter slip profile based upon a current torque converter slip, the desired torque converter slip, and a time constraint; and modulating the torque converter clutch pressure command based upon the torque converter slip profile; wherein the torque converter slip profile comprises one of a linear reduction, an exponential decay reduction, a quadratic reduction, a spline-defined reduction, and a filter-based reduction.

9. The method of claim 8, wherein the torque converter slip profile is based upon at least one of the rapid change in engine torque, a current transmission gear, and a monitored temperature of the torque converter clutch.

10. Method for responding to a rapid change in engine torque in a powertrain comprising an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; determining a rapid change in engine torque when the change in engine torque exceeds a threshold change in engine torque; subsequent to determining a rapid change in engine torque, providing an increase in the torque converter slip by reducing the torque converter clutch pressure command by a selected value and thereafter deactivating the feedback control for a predetermined duration; and subsequent to the predetermined duration, reactivating the feedback control to decrease the torque converter slip toward a desired torque converter slip value, wherein reactivating the feedback control to decrease the torque converter slip toward the desired torque converter slip value comprises: determining a torque converter slip profile based upon a current torque converter slip, the desired torque converter slip, and a time constraint; and modulating the torque converter clutch pressure command based upon the torque converter slip profile; wherein the torque converter slip profile comprises one of a linear reduction, an exponential decay reduction, a quadratic reduction, a spline-defined reduction, and a filter-based reduction.

11. Method for responding to a rapid change in engine torque in a powertrain comprising: an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; monitoring temperature of the torque converter clutch; determining a rapid change in engine torque when the change in engine torque exceeds a threshold change in engine torque; subsequent to determining a rapid change in engine torque, providing an increase in the torque converter slip by reducing the torque converter clutch pressure command by a selected value and thereafter deactivating the feedback control for a predetermined duration; and subsequent to the predetermined duration, reactivating the feedback control to decrease the torque converter slip toward a desired torque converter slip value; comparing the monitored temperature a limit temperature; and deactivating the feedback control based upon the comparing; wherein deactivating the feedback control comprises releasing the torque converter clutch.

12. Method for responding to a rapid change in engine torque in a powertrain comprising: an engine, a transmission, a torque converter located between the engine and the transmission, and a torque converter clutch, the torque converter clutch being responsive to a torque converter clutch pressure command including a slip-based feedback control controlling a torque converter slip, the method comprising: monitoring a change in engine torque; monitoring temperature of the torque converter clutch; determining a rapid change in engine torque when the change in engine torque exceeds a threshold change in engine torque; subsequent to determining a rapid change in engine torque, providing an increase in the torque converter slip by reducing the torque converter clutch pressure command by a selected value and thereafter deactivating the feedback control for a predetermined duration; subsequent to the predetermined duration, reactivating the feedback control to decrease the torque converter slip toward a desired torque converter slip value; comparing the monitored temperature a limit temperature; and deactivating the feedback control based upon the comparing; wherein deactivating the feedback control comprises locking the torque converter clutch.

* * * * *